United States Patent [19]

Hill

[11] 3,980,353

[45] Sept. 14, 1976

[54] BEARINGS

[75] Inventor: Joseph Henry Hill, Greenford, England

[73] Assignee: Vandervell Products Limited, England

[22] Filed: Apr. 4, 1975

[21] Appl. No.: 565,089

[30] Foreign Application Priority Data

Apr. 9, 1974 United Kingdom............... 15662/74
Nov. 8, 1974 United Kingdom............... 48499/74

[52] U.S. Cl................................ 308/92; 308/79.1; 308/90

[51] Int. Cl.² ........................................ B61F 17/00

[58] Field of Search ............... 308/79, 92, 126, 240, 308/79.1, 41, 90

[56] References Cited
UNITED STATES PATENTS

| | | | |
|---|---|---|---|
| 1,677,171 | 7/1928 | Casey et al. ........................ | 308/240 |
| 2,174,307 | 9/1939 | Coultas et al. ...................... | 308/126 |
| 2,785,020 | 3/1957 | Browne................................. | 308/90 |
| 2,829,015 | 4/1958 | Holin ................................... | 308/79 |
| 2,969,259 | 1/1961 | Rykoskey et al. .................. | 308/79.1 |
| 3,363,951 | 1/1968 | Rykoskey............................. | 308/79 |

Primary Examiner—M. H. Wood, Jr.
Assistant Examiner—Richard A. Bertsch
Attorney, Agent, or Firm—Edward F. Connors

[57] ABSTRACT

The disclosure relates to a bearing for a railway vehicle axle comprising a housing enclosing a bearing liner to receive an end of the axle. One end of the housing has an end cap shaped to provide an oil reservoir and there is at least one cavity in the lower part of the housing leading from the reservoir to a port in the lower part of the bearing liner to deliver lubricant to the axle end supported in the liner. The other end of the housing has an oil seal to engage the axle.

5 Claims, 5 Drawing Figures

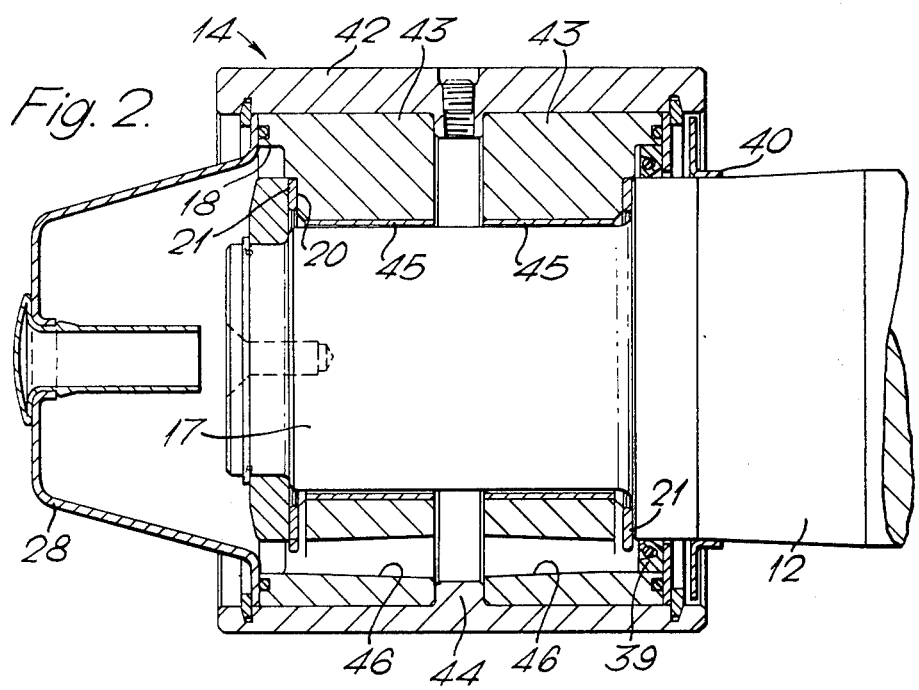
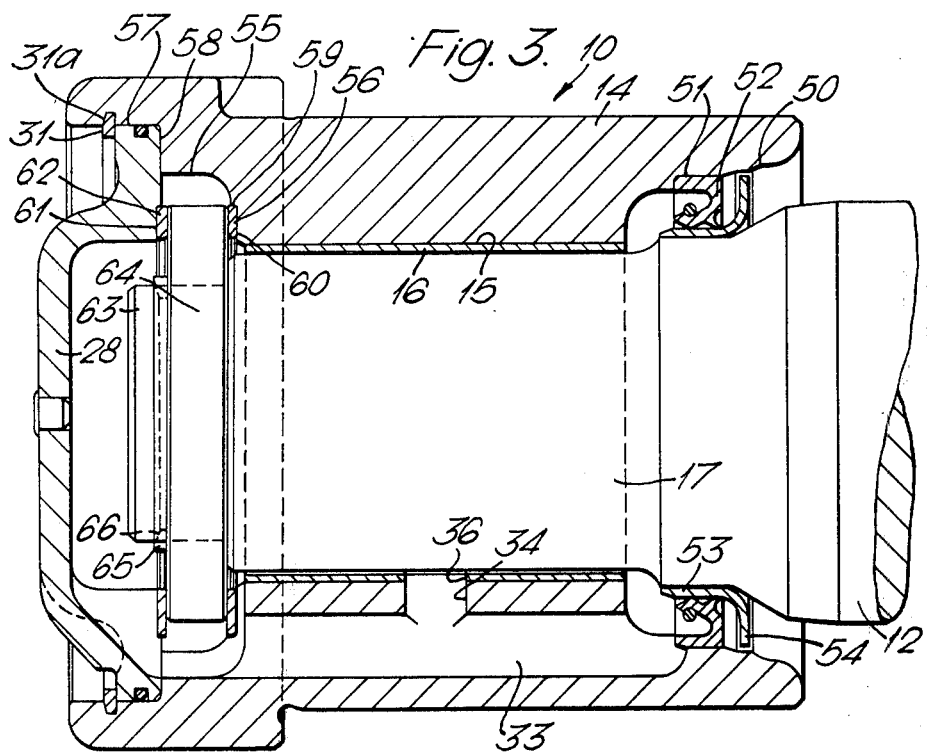

3,980,353

BEARINGS

BACKGROUND OF INVENTION

1. Field of the Invention

The invention relates to bearings and is particularly although not exclusively, applicable to bearings for railway vehicles.

2. Description of the Prior Art

U.S. Pat. No. 1,677,171 discloses an axle bearing for railway equipment comprising a journal bearing casting, a lubricant reservoir attached to one end of the bearing casting, a bushing rotatably mounted in the bearing, an axle rotatably mounted in said bushing. The axle has an end portion positioned within the reservoir and a central hole is drilled into the axle from said end portion the hole extending the full length of the journal. A plurality of radial holes extend from the central hole so that lubricant may flow from the reservoir to the centre of the bushing. A plurality of holes are drilled in the wall of the bushing to lubricate the inner surface of the liner.

The problem which this arrangements present arises from the requirement that the oil film between the top portion of the axle and the journal should be capable of withstanding the downward load of the railway vehicle supported by the bearing. To generate sufficient pressure in the oil for this purpose the axle should be slightly smaller in diameter than the inner surface of the journal so that the downward load causes the axle to run slightly off centre with respect to the bearing. Thus the annular space between the bearing and axle tapers towards the top of the axle and the film of lubricant drawn round with the shaft as it rotates in the liner is drawn into the tapering annular space and is compressed to a pressure which supports the axle surface away from the journal surface. In the bearing of U.S. Pat. No. 1,677,171 there are radial holes in the axle which will relieve any such pressure build up in the oil at the top of the axle and so the essential rise in pressure in the lubricant towards the top of the axle will not occur and there is a consequent risk of metal to metal contact between the bearing liner and axle when subjected to load.

The object of the applicant's invention is to overcome the above problem, that is to deliver the lubricant from an end reservoir of a bearing housing to a liner in the housing without preventing the build up of pressure between the axle and the liner required to support the axle and liner apart when subjected to load.

SUMMARY OF THE INVENTION

The invention provides a bearing for an axle end comprising a housing having at least one cylindrical bearing liner mounted in the housing to receive the axle end from one end of the housing, sealing means at said one end of the housing to form a lubricant seal with the axle, oppositely facing annular thrust faces on the housing for engaging opposite facing thrust faces on the axle, an end cap secured to the other end of the housing and providing a lubricant reservoir, and means to conduct the lubricant from said reservoir to the bearing liner and thrust faces.

BRIEF DESCRIPTION OF THE DRAWINGS

The following is a description of some specific embodiments of the invention, reference being made to the accompanying drawings in which:

FIG. 2 is a sectional view through a second arrangement;

FIG. 3 is a sectional view through a third bearing for a railway vehicle axle;

DESCRIPTION OF THE PREFERRED EMBODIMENTS

Figure 1:
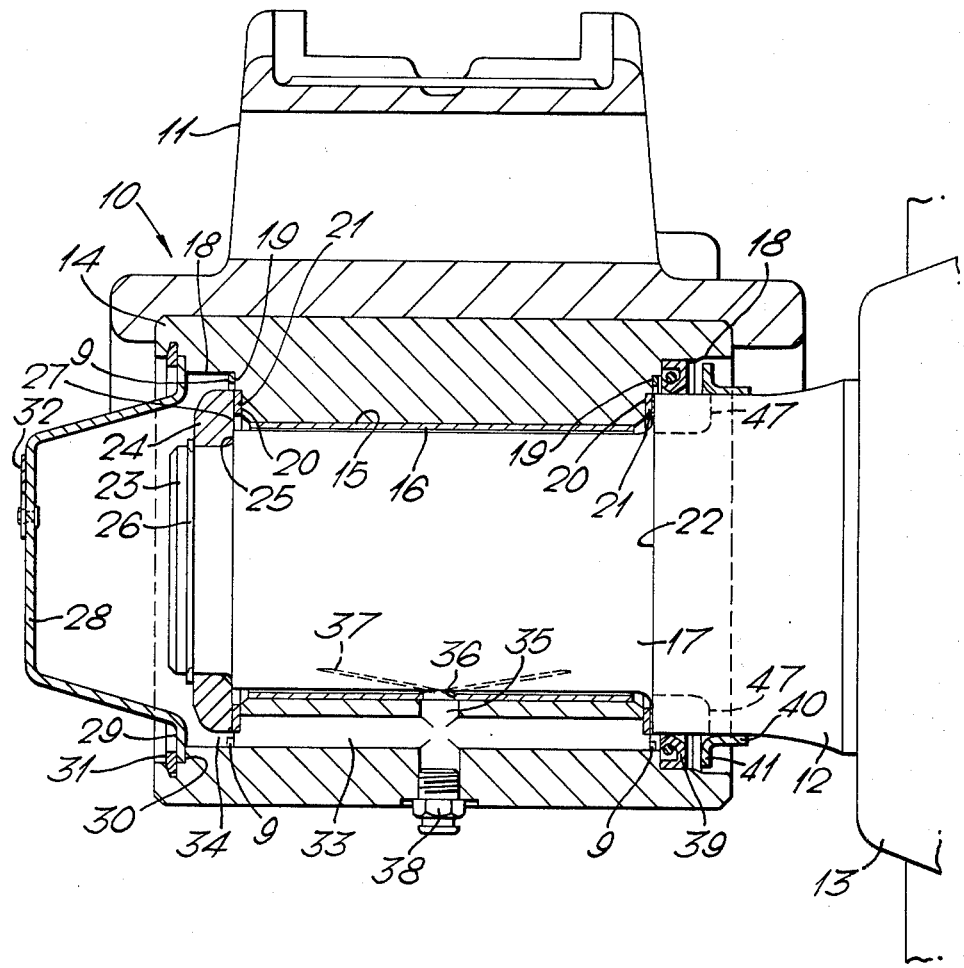
FIG. 1 is a sectional view through a bearing for a railway vehicle axle.

FIG. 1 shows a railway vehicle bearing 10 mounted in an adapter indicated in dotted outline at 11 for supporting one end of a railway wagon axle 12 in a suitable support. A wheel on the axle is indicated in dotted outline at 13.

The bearing comprises a generally cylindrical housing 14 which is mounted in the adapter 11. The housing 14 has a cylindrical bore 15 in which a cylindrical bearing liner 16 is mounted. The axle 12 has a reduced diameter end journal 17 which runs in the bearing liner 16. The external diameter of the journal 17 is slightly less than the internal diameter of the bearing liner 16 for the purpose described later.

The opposite ends of the cylindrical housing 14 are counter-bored as indicated at 18 forming outwardly axially facing annular shoulders 19 adjacent the ends of the housing. Annular recesses 20 are formed around the inner edges of the shoulders 19 and annular thrust washers 21 are mounted in the recesses. Each thrust washer may be formed as a complete annulus or may be formed in four arcuate segments each with or without a radially projecting tongue (not shown) midway around the outer periphery thereof. The tongues when provided engage in slots (not shown) in the shoulders and circlips 9 are located on the counter-bores 15 against the shoulders to hold the tongues in the slots and thereby hold the thrust washers in place. Between the reduced diameter journal 17 and the main part of the axle 12, there is an axially facing shoulder 22 and this shoulder engages the thrust washer or washers 21 at one end of the housing. At the other end of the journal 17, the diameter of the axle is reduced to form a boss 23 and a collar 24 is located on the boss against the shoulder 25 between the boss and journal 17. A circlip 26 is located in a groove in the boss to hold the collar 24 against the shoulder. The collar 24 has an axially directed fact 27 in engagement with the other of the thrust washers 21 so that the axle 12 is positively located against axial movement by the two thrust washers 21 or to permit a limited required axial freedom.

The end of the housing 14 opposite the axle end is closed by a cup shaped cap 28 having a rim 29 which engages an outwardly facing shoulder 30 formed in the counter-bore 18 and is held against the shoulder by a circlip 31. The cap provides a reservoir for lubricant, that is oil or grease, for the bearing.

The wall of the housing 14 is formed with an axially extending cavity 33 extending between the shoulders at the bottom of the housing. One end of the axial cavity 33 in communication with the reservoir provided by the cap 28 through the gap indicated at 34 between the outer periphery of the collar 24 and the counter-bore 18 in the housing. There is a radial opening 35 or openings through the housing at the lower end thereof midway along the housing, the opening 35 intersecting the axial cavity 33. The opening or openings 35 is or are in register with a port or ports 36 in the bearing liner 16 and the bearing surface of the liner is formed with four grooves 37 radiating from the or each port 36 axially and circumferentially around the surface of the liner. The lower end of the opening 35 in the housing is closed by a plug 38 screwed into the bore. To charge the reservoir provided by the cap 28 with lubricant, the plug 38 is removed and lubricant is injected through the opening 35.

The lubricant fills the axial cavity 33, the radial opening 35 and reaches the port 36 from where lubricant can flow into the grooves 37. As the journal 17 rotates in the bearing liner, the lubricant is picked up by the surface of the shaft. As indicated earlier, the diameter of the journal 17 is slightly less than that of the bore of the liner and the weight of the railway vehicle acting on the housing will result in the axis of the liner being slightly lower than the axis of the journal. Thus the gas between the surfaces of the liner and journal will taper to a minimum at the top of the journal. A film of lubricant drawn around the surface of the liner by the rotating journal will be drawn into the tapered region and in so doing is pressurised. The thin wedge of pressurised lubricant in the tapered region supports the surface of the bearing liner away from the surface of the journal to prevent metal to metal contact therebetween.

The lubricant in the axial cavity 33 will also feed the bearing surfaces of the thrust washers 21 and lubricant escaping from the ends of the liner 16 also reaches the surfaces of the thrust washers.

Lubricant is prevented from escaping from the housing by a lip type or labyrinth seal 39 mounted in the counter-bore 18 at the end of the housing into which the axle 12 projects, the lip of the seal running on the outer surface of the axle. A dirt excluding ring 40 is mounted on the axle 12 adjacent the end of the housing, the ring 40 having an out turned flange 41 the periphery of which is closely spaced from the counter-bore 18.

FIG. 2 of the drawings shows a further embodiment of the invention which is similar to the view above described and like parts have been allotted the same reference numerals. The main difference is that the housing 14 comprises an outer sleeve 42 and two inner sleeves 43 spaced apart by a shoulder 44 around the inner periphery of the outer sleeve 42 at the centre thereof. Also the bearing liner is formed in two parts 45, one for each sleeve 43. The axial bore for delivering lubricant from the reservoir cap 28 to the bearing liners and thrust washers is formed through the two sleeves as indicated at 46. Instead of the radial opening 35 through the housing, the lubricant reaches the bearing liners through the gap between the sleeves 43 and liners 45.

It will be understood that many modifications may be made to the above described embodiments without departing from the scope of the invention. For example, the thrust face 22 on the shaft 12 could be formed on a separate replaceable collar as indicated by the dotted outline 47.

FIG. 3 shows a further embodiment in which a bearing 10 is mounted in an adaptor for supporting one end of a railway wagon axle 12 located in an axle box. The bearing comprises a generally cylindrical housing 14 which has a cylindrical bore 15 in which a thin wall flexible cylindrical bearing liner 16 which may be formed in two semi-cylindrical parts is mounted. The liner may be formed from a steel backed bearing material or an aluminium alloy such as aluminium tin with no steel backing to promote heat transfer from the bearing liner to the housing. Also it is preferred that the housing is formed from an alloy of high thermal conductivity such as an aluminium alloy. The axle has a reduced diameter end journal 17 which runs in the bearing liner 16 and the external diameter of the journal 17 is slightly less than the internal diameter of the bearing liner 16 as described above.

At the inner end of the housing 14 through which the axle 12 projects the housing is formed with a stepped counter-bore 50 which includes a seat 51 in which an annular lip-type oil seal 52 is mounted. The oil seal 52 runs on a metal sleeve 53 pressed on to the periphery of the shaft 12 and the sleeve is formed with an outwardly directed annular flange 54 at the end thereof adjacent the end of the housing which substantially closes the gap between the shaft 12 and counter-bore 50 to exclude dirt and other foreign matter from entering the housing.

The outer end of the housing is formed with an inner counter-bore 55 spaced an by outwardly facing shoulder 56 from the bore 14 and an outer counter-bore 57 spaced from the counter-bore 55 by an outwardly facing shoulder 58. The outer end of the housing 14 is closed by a cup-shaped cap 28 held in place by a circlip 31 which locks in a groove 31a in the counter-bore 57 in a similar manner to that of the embodiment of FIG. 1 described above. Alternatively the cap may be secured to the housing by any other suitable locking means such as studs. Also a gasket may be placed between the end cap and housing to ensure that lubricant cannot leak from the thrust assembly under conditions of high axial loading.

The shoulder 56 on the housing is formed with an annular recess 59 providing a seating for an annular thrust washer 60 which may be a complete annulus or in arcuate segments facing axially towards the end cap 28. The inner side of the end cap 28 is formed with a similar annular recess 61 providing a seating for a similar annular thrust washer 62 which faces axially towards the thrust washer 60. The extreme end of the journal 17 of the shaft 12 is formed with a reduced diameter spigot 63 and a thrust collar 64 is mounted on the spigot and is held in place by a circlip 65 engaging in a groove 66 in the spigot. The thrust collar 64 engages between the thrust washers 60 and 62 to locate the shaft 12 axially in the bearing 10. The thrust washers may be formed from bearing material alone or steel backed bearing material. In a further construction the thrust faces on the collar 64 are surfaced with a bearing material to engage directly on thrust faces on the housing and end cap respectively.

The lower part of the housing 14 is formed with an axially extending cavity 33 which is in communication at one end with the inner side of the end cap 28 which provides a reservoir for a lubricant which may be grease or an oil. The housing 14 has a radial opening 34 extending inwardly from the axial cavity 33 and the bearing liner 16 has an aperture 36 in register with the opening 34 to feed lubricant from the bore on to the rotating journal 17 in the liner. The inner surface of the liner may be formed with surface grooves to distribute lubricant over the surface of the journal which engages the liner.

The outer end of the housing 14 in which the thrust washers are located may project into the air stream of the moving vehicle which assists in cooling the outer end of the housing and therefore the thrust washers. This ensures that the bearing operates at the lowest possible temperature and this minimises power loss. It will be understood that the shape of the end cap will be adapted to suit the particular installation in the railway vehicle bogie or pedestal.

Figure 4:
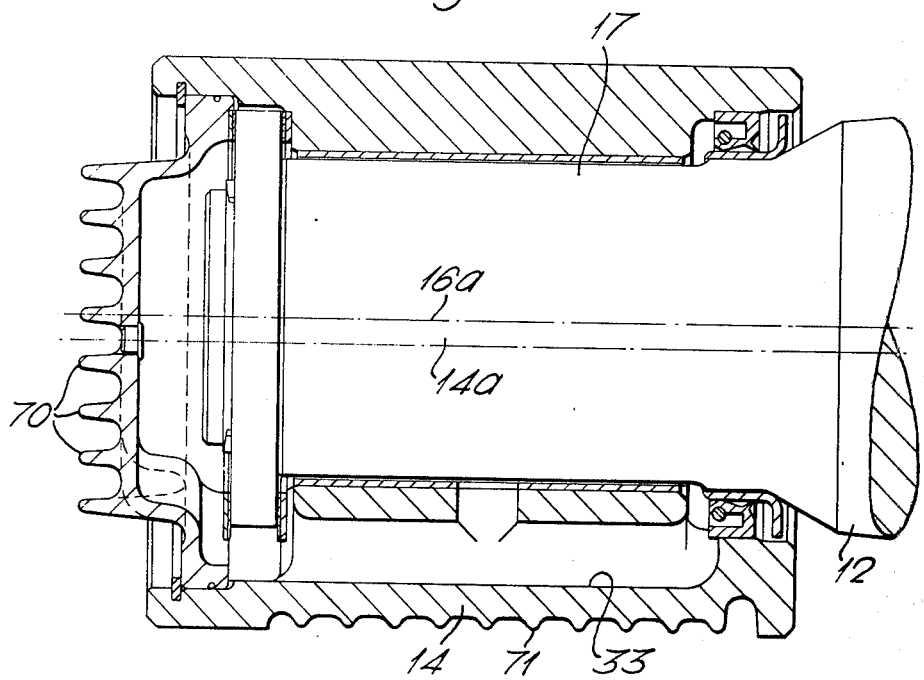
FIG. 4 is a sectional view through a fourth bearing for a railway vehicle axle.

FIG. 4 shows a similar arrangement in which the end cap 28 is formed with an external finning 70 and the housing 14 is also formed with external fins 71. The shape, number and distribution of cooling fins or scoops is related to the design of the associated running gear in order to maximise the cooling effect of the air stream.

Figure 5:
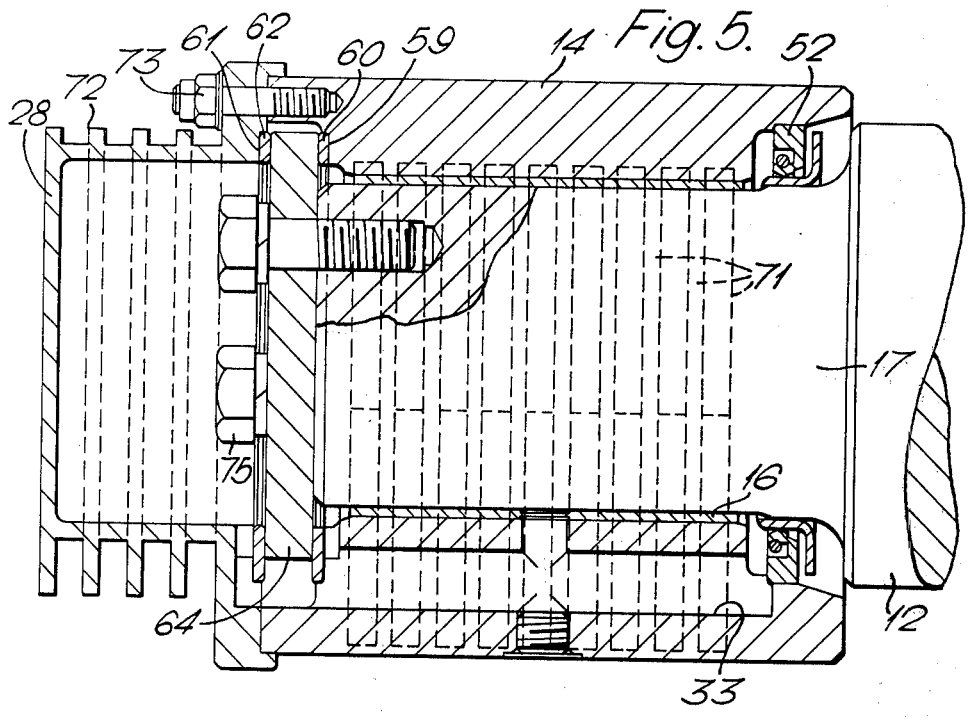
FIG. 5 is a section through a fifth form of bearing.

FIG. 5 shows a further similar arrangement in which the end cap 28 is formed in a deep cup-shape to increase the reservoir for lubricant and has circumferential fins 72. The end cap secured to the housing 41 by bolts 73 in place of the circlip and the thrust collar 64 is also secured to the housing by bolts 75. The axis 14a of the housing is arranged to be located eccentric to and below the axis 16a of the bearing liner and axle end so that the weight on the axle box acts to oppose rotation of the housing in its seating in the adaptor in which it is supported. The arrangement is otherwise similar to that described with reference to FIG. 3 above.

To reduce the operating temperature of a bearing as described above it is necessary both to reduce the amount of heat generated in the bearing unit and to ensure rapid and effective removal of any heat that is generated.

It has been found that one effective way of reducing heat generated, whether the bearing is lubricated by oil or grease, is to reduce the relative speed between the shaft and the bearing. This is done by reducing the diameter of the bearing to the minimum value possible while still giving adequate journal strength at the shoulder.

I claim:

1. A bearing for an axle end comprising a housing having at least one cylindrical bearing liner mounted in the housing and having a cylindrical bearing surface to receive the axle end from one end of the housing, sealing means at said one end of the housing to form a lubricant seal with the axle, oppositely facing annular thrust faces on the housing, oppositely facing thrust faces on the axle in engagement with the thrust faces on the housing, a hollow end cap extending over and secured to the other end of the housing containing the axle end, a lubricant supply filling the reservoir to a level above the bottom of the axle end, delivery passage means extending through the housing from the reservoir to a bottom region of the bearing surface of the bearing liner and return flow passage means leading from at least one axial end of the bearing liner adjacent the reservoir to the reservoir to permit flow of lubricant from the reservoir to the bearing and return flow from the bearing to the reservoir.

2. A bearing a claimed in claim 1 wherein the return flow passage means includes working clearances between the thrust faces on the axle and the oppositely facing annular thrust faces on the housing and passage means connecting at least one axial end of the liner with an inner peripheral side of at least one of the thrust faces on the housing and the thrust face on the axle in engagement therewith and further passage means communicating the outer side of that thrust face on the housing and the thrust face on the axle with the reservoir.

3. In a bearing assembly, the combination of an axle having a solid journal provided with a completely cylindrical surface, a cylindrical housing substantially enclosing the journal and having an inner and an outer end, a cylindrical bearing liner mounted in the housing and having a cylindrical bearing surface surrounding the journal in very slightly spaced relation therewith and being provided to receive the journal from the inner end of the housing, sealing means at said inner end of the housing to form a lubricant seal with the journal, oppositely facing annular thrust faces on the housing, oppositely facing thrust faces on the journal in engagement with the thrust faces on the housing, a hollow end cap extending over and secured to the outer end of the housing containing the journal, an axial cavity provided in the inner surface of the lower part of the housing and being in free communication with the end cap, said end cap providing a reservoir for a lubricant, a lubricant supply filling the reservoir to a level above the bottom of the journal, delivery passage means extending through the housing from the cavity to a bottom region of the bearing surface of the bearing liner with the lubricant being forced from the reservoir along the cavity and through the delivery passage means by the head of lubricant in the reservoir as the journal rotates with its lower part immersed in the lubricant and the rotating journal draws the lubricant into the gap between the top of the journal and the bearing liner whereby a hydrodynamic lubricant film supports the journal away from the liner to prevent metal to metal contact and return flow passage means leading from one axial end of the bearing liner adjacent the reservoir to permit return flow of the lubricant from the bearing to the reservoir where the lubricant is cooled.

4. The invention of claim 3 wherein the return flow passage means includes working clearances between the thrust faces on the journal and the housing.

5. The invention of claim 3, wherein said end cap is provided with air cooling means whereby the lubricant therein is cooled by the ambient air.

* * * * *